April 25, 1933. A. F. JOHNSON 1,905,643
APPARATUS FOR SINKING BODIES SUCH AS CAISSONS AND PILES
Filed Oct. 14, 1931 2 Sheets-Sheet 1
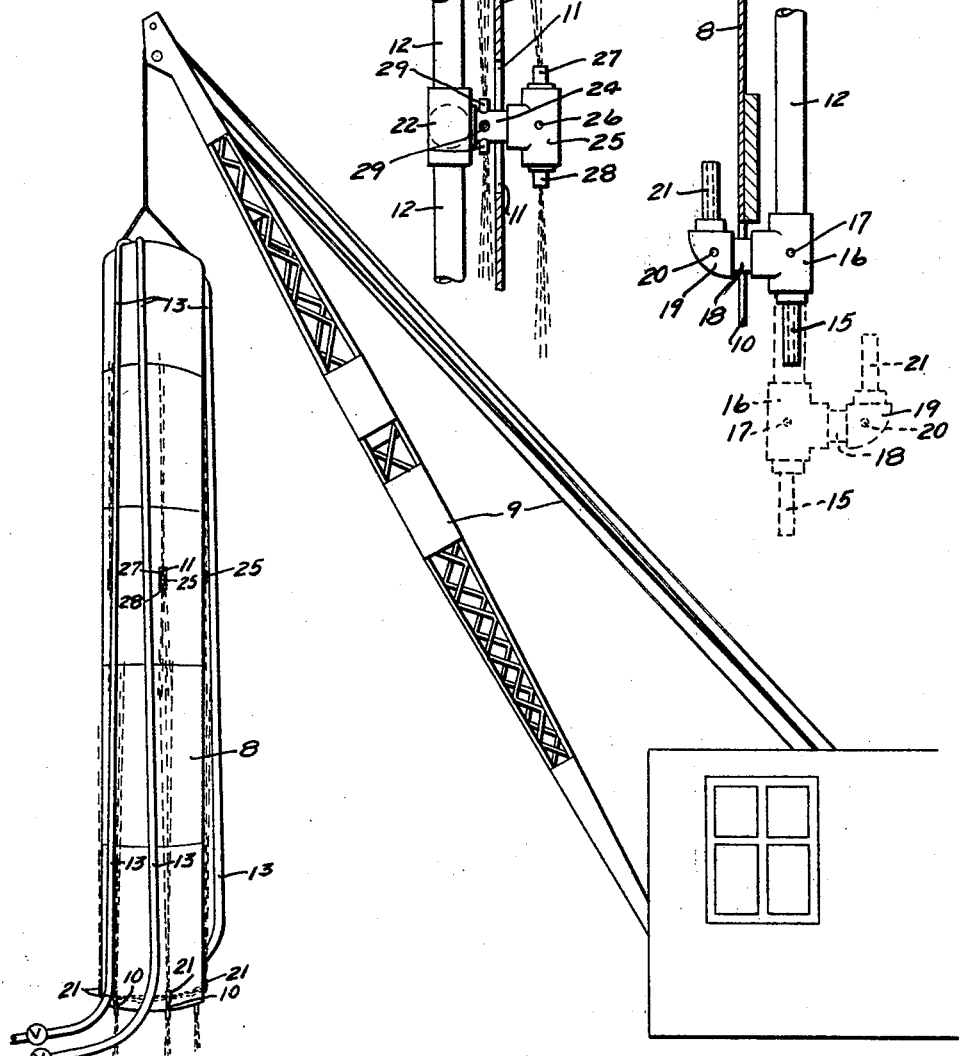
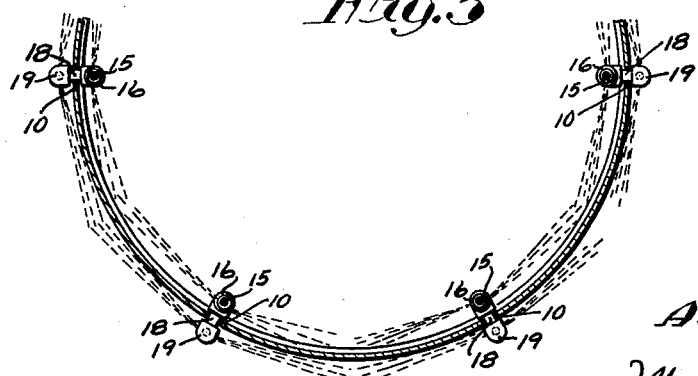
Inventor
Algot F. Johnson
By his Attorneys

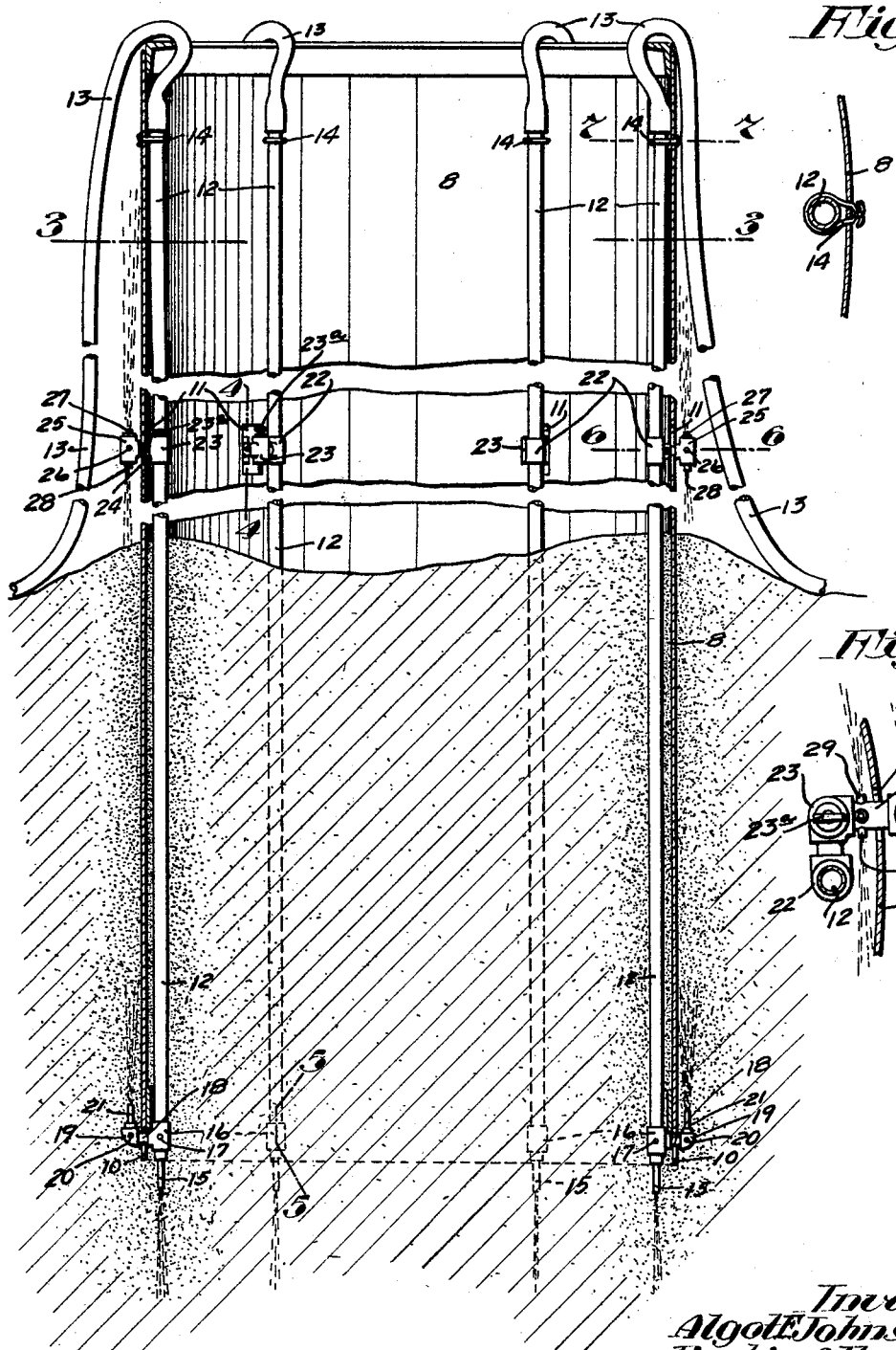

Patented Apr. 25, 1933

1,905,643

UNITED STATES PATENT OFFICE

ALGOT F. JOHNSON, OF MINNEAPOLIS, MINNESOTA, ASSIGNOR TO AL JOHNSON CONSTRUCTION CO., OF MINNEAPOLIS, MINNESOTA, A CORPORATION OF DELAWARE

APPARATUS FOR SINKING BODIES SUCH AS CAISSONS AND PILES

Application filed October 14, 1931. Serial No. 568,729.

My invention provides an improved method for the sinking of bodies such as caissons and piles, and an improved apparatus for carrying out the process. Hitherto caissons and piles have been sunk by a jetting process wherein water has been delivered at the lower ends of the piles and at the lower edges of the caisson and such processes have been found an assistance to the driving or setting of piles and caissons into sandy soil that is capable of being loosened up and washed by the water. My invention however, involves a new or improved process and an apparatus whereby the process may be carried out in the most efficient way and the piles and caissons can be sunk or driven more rapidly and to greater depth.

In the accompanying drawings, which illustrate the improved apparatus for the carrying out of the improved process, like characters indicate like parts throughout the several views.

Referring to the drawings:

Fig. 1 is an elevation partly in diagram showing the apparatus applied to a caisson, the caisson being suspended by a derrick and positioned for driving;

Fig. 2 is a vertical axial section with some parts broken away showing the caisson with the improved apparatus attached thereto partly driven to position;

Fig. 3 is a fragmentary section taken on the line 3—3 of Fig. 2;

Fig. 4 is a fragmentary vertical section taken on the line 4—4 of Fig. 2;

Fig. 5 is a fragmentary section taken on the line 5—5 of Fig. 2;

Fig. 6 is a fragmentary horizontal section taken on the line 6—6 of Fig. 2; and

Fig. 7 is a fragmentary horizontal section taken on the line 7—7 of Fig. 2.

Referring first to Fig. 1, the caisson shown to be made of a multiplicity of connected sheet metal cylinders, is indicated by the numeral 8. This caisson is there shown as suspended preparatory to sinking by a derrick, indicated as an entirety by the numeral 9. Preparatory to the application of jetting apparatus, the caisson is provided at its lower edge with circumferentially spaced open notches 10 and above said notches with vertical slots 11. The jetting apparatus includes vertical jetting pipes 12 that are spaced circumferentially and extended vertically within the caisson and are supplied with water from a source of water under pressure, preferably through hose sections 13 attached to the upper ends of the respective pipes. To temporarily hold the upper ends of the pipe sections 12 in position, wire loops 14 are shown as passed around the same and through perforations in the caisson near the top of said caisson. At their extreme lower ends, the jetting pipes 12 are provided with jetting nozzles 15 that extend below the lower edge of the caisson, but close to the interior of the caisson. These jetting nozzles 15 are shown as connected to the lower ends of the pipes 12 by pipe couplings 16 that are formed with diametrically opposite jetting ports 17 and are provided with short outstanding pipe sections 18, that extend outward through the notches 10 and are provided with elbow couplings 19 formed with diametrically opposite jetting ports 20 and with upstanding jetting nozzles 21.

Approximately in the plane of the notches 11 of the caisson, the jetting pipes 12 have interposed pipe couplings 22 that are connected to a valve casing 23 in which is a normally closed valve 23ª. Valve casing 23 is provided with short outstanding pipe sections 24 that extend through the notches 11 and at their outer ends are connected to jetting heads 25 that have lateral jetting ports 26 and upwardly and downwardly extending jetting nozzles 27 and 28. Just inside the caisson, pipe sections 24 are formed with upwardly, downwardly and laterally projecting jetting ports 29.

The manner in which the jetting pipes and nozzles are temporarily applied to the caisson is about to be indicated, but attention is called to the fact that the slots 11 are of a size to permit the spraying heads 25 to be passed laterally therethrough and the lower outstanding pipe sections 18 will, under downward pressure on the caisson, be held in the notches 10 so that the spraying pipes and their nozzles will be held in proper association with the caisson while it is being sunk or driven into the ground.

In initiating the driving or settling of the caisson in the earth, the lower jetting nozzles will, of course, be opened, but it is desirable to keep the upper jetting devices closed until they have reached the surface of the ground, after which the valves 23ª will be opened. When the jetting devices are in action, jets of water under high pressure will be forced downward below the lower edge of the caisson by the jets 15 and the sandy earth will be very thoroughly loosened up both inside and outside of the caisson at or in the vicinity of the lower edge thereof, so that the sandy soil through which the caisson will be sunk will be made much like quick-sand. The upper jetting devices keep the sandy soil along both the interior and the exterior of the caisson loosened up from top to bottom so that the frictional resistance in the sinking of caissons will be reduced to a minimum. In fact, in ordinary sandy soil, I have found that a caisson will sink many feet into the ground under the action of the jetting devices without pressure on the caisson other than the natural weight thereof, and that after the caisson has been sunk as far as it will go under its own weight, that it can be forced to greater depths than hitherto possible, or to any given depth under much less pressure than hitherto required. After the caisson has been sunk, to the desired depth, the jetting pipes may be detached therefrom first by moving the jets in the heads 25 inward through the slots 11 and then pressing downward on the jetting pipes to carry the jetting devices 20 and 21 below the lower edge of the caisson, and then rotating the jetting pipes so as to turn the said lower jetting pipes inside of the caisson. Of course, also, the jetting pipes must be released from the anchoring loops 14. When this has been done, the jetting pipes may be withdrawn and again used in the sinking of other caissons.

What I claim is:

The combination with a caisson having circumferentially spaced notches at its lower edge, of circumferentially spaced longitudinally extended jetting pipes within said caisson, said pipes terminating at their lower ends in close proximity to the bottom edge of the caisson and arranged to project jets of water downwardly from the inside of the lower edge portion of the caisson and being provided near their lower ends with projections extending outwardly through the said notches in the lower edge of the caisson and arranged to project jets of water upwardly past the outside of the caisson.

In testimony whereof I affix my signature.

ALGOT F. JOHNSON.